(12) United States Patent
Danielson et al.

(10) Patent No.: US 11,899,409 B2
(45) Date of Patent: Feb. 13, 2024

(54) EXTREMUM SEEKING CONTROL SYSTEM AND A METHOD FOR CONTROLLING A SYSTEM

(71) Applicant: Mitsubishi Electric Research Laboratories, Inc., Cambridge, MA (US)

(72) Inventors: Claus Danielson, Albuquerque, NM (US); Ankush Chakrabarty, Bedford, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 202 days.

(21) Appl. No.: 17/194,283

(22) Filed: Mar. 7, 2021

(65) Prior Publication Data

US 2022/0291641 A1  Sep. 15, 2022

(51) Int. Cl.
  *G05B 13/02* (2006.01)
(52) U.S. Cl.
  CPC ................... *G05B 13/021* (2013.01)
(58) Field of Classification Search
  CPC ...... G05B 13/021; G05B 15/02; G05B 11/42; G05B 13/042; G06F 17/18; F24F 11/30
  See application file for complete search history.

(56) References Cited

U.S. PATENT DOCUMENTS

| | | | |
|---|---|---|---|
| 8,200,345 B2 | 6/2012 | Li et al. | |
| 8,447,443 B1* | 5/2013 | Ryan | G05B 13/042 340/992 |
| 9,625,274 B2 | 4/2017 | Burns et al. | |
| 9,729,639 B2 | 8/2017 | Sustaeta et al. | |
| 10,352,576 B2* | 7/2019 | Salsbury | F24F 11/30 |
| 10,482,895 B2 | 11/2019 | Lashkari et al. | |
| 10,845,070 B2* | 11/2020 | Salsbury | F24F 11/62 |
| 11,467,544 B1* | 10/2022 | Chakrabarty | G05B 13/024 |
| 2008/0123208 A1* | 5/2008 | Chen | G11B 7/08505 |
| 2008/0170756 A1* | 7/2008 | Beucher | G06V 10/28 382/109 |

(Continued)

OTHER PUBLICATIONS

Danielson, Claus, Scott A. Bortoff, and Ankush Chakrabarty. "Extremum Seeking Control With an Adaptive Gain Based on Gradient Estimation Error." IEEE Transactions on Systems, Man, and Cybernetics: Systems (2022). (Year: 2022).*

(Continued)

*Primary Examiner* — Alicia M. Choi
(74) *Attorney, Agent, or Firm* — Gene Vinokur

(57) ABSTRACT

An extremum seeking control system and a method for controlling a system is provided. The method comprises receiving a tracking error, consecutive measurements of a system output, and consecutive measurements of a cost function of the system, and estimating a gradient based on the tracking error, the consecutive measurements of the system output, and the consecutive measurements of the cost function of the system. The method further comprises determining a step-size based on a ratio of a covariance of the gradient to the gradient, and determining a set-point optimizing performance of the system, based on the gradient and the step-size. The method further comprises controlling the system based on the set-point optimizing performance of the system.

16 Claims, 13 Drawing Sheets

| Condition | Operation Mode |
|---|---|
| The adapted step size is smaller than the step-size threshold | Exploration mode |
| The adapted step size is greater than the step-size threshold | Exploitation mode |

(56) References Cited

U.S. PATENT DOCUMENTS

| | | | | |
|---|---|---|---|---|
| 2010/0099194 A1* | 4/2010 | Okabayashi | ......... | G01N 21/253 436/55 |
| 2011/0276182 A1* | 11/2011 | Seem | .................... | F25B 49/027 713/320 |
| 2015/0178633 A1* | 6/2015 | ElBsat | .................... | G06F 17/16 706/14 |
| 2015/0277444 A1* | 10/2015 | Burns | ...................... | F24F 11/64 700/282 |
| 2017/0241658 A1* | 8/2017 | Salsbury | .................. | F24F 11/83 |
| 2017/0350944 A1* | 12/2017 | Pajovic | .............. | G01R 31/3648 |
| 2018/0046164 A1* | 2/2018 | Drees | .................. | G05B 13/021 |
| 2018/0267515 A1* | 9/2018 | House | ...................... | F24F 11/63 |
| 2018/0284701 A1* | 10/2018 | Salsbury | .................. | F24F 11/62 |
| 2018/0299839 A1* | 10/2018 | Salsbury | ............... | G05B 13/022 |
| 2019/0041077 A1* | 2/2019 | Salsbury | .................. | F24F 11/70 |
| 2019/0293308 A1* | 9/2019 | Salsbury | .................. | F24F 11/77 |
| 2020/0064004 A1* | 2/2020 | Salsbury | .............. | G05B 13/021 |
| 2020/0149757 A1* | 5/2020 | Salsbury | ............... | F24F 5/0035 |
| 2020/0159177 A1* | 5/2020 | Salsbury | .............. | G05B 19/042 |
| 2021/0181703 A1* | 6/2021 | Perez | .................... | G05B 15/02 |
| 2021/0215378 A1* | 7/2021 | Salsbury | ............ | G05B 13/0225 |
| 2022/0291641 A1* | 9/2022 | Danielson | ............ | G05B 13/021 |
| 2022/0308529 A1* | 9/2022 | Chakrabarty | ............ | G05B 6/02 |
| 2022/0316736 A1* | 10/2022 | Nabi | ........................ | G06F 30/20 |
| 2022/0335179 A1* | 10/2022 | Chakrabarty | .......... | G06N 7/005 |

OTHER PUBLICATIONS

Ariyur, Kartik B., and Miroslav Krstić. "Slope seeking: a generalization of extremum seeking." International Journal of Adaptive Control and Signal Processing 18.1 (2004): 1-22. (Year: 2004).*

Salsbury, Timothy I., et al. "An extremum-seeking control method driven by input-output correlation." Journal of Process Control 58 (2017): 106-116. (Year: 2017).*

Gelbert, G., Moeck, J.P., Paschereit, C.O. and King, R., 2012. Advanced algorithms for gradient estimation in one-and two-parameter extremum seeking controllers. Journal of Process Control, 22(4), pp. 700-709. (Year: 2012).*

Dewasme et al. Model Free extremum seeking control of bioprocesses: A review with a worked example. Process 2020, 8, 1209. pp 1-30.

* cited by examiner

| Condition | Operation Mode |
|---|---|
| The adapted step size is smaller than the step-size threshold | Exploration mode |
| The adapted step size is greater than the step-size threshold | Exploitation mode |

FIG. 1B

$$A_t^{-1} = \frac{1}{N} \sum_{k=t-1}^{t-N} \frac{\Delta y_k \Delta y_k^\top}{w_k}$$

$$\hat{\theta}_t = \frac{1}{N} \sum_{k=t-1}^{t-N} A_t \frac{\Delta y_k}{w_k} \underbrace{(\Delta \mathcal{J}_k - \Delta y_k^\top \hat{H}(e_t + \frac{1}{2} \Delta y_k))}_{406}$$

FIG. 4    GRADIENT ESTIMATION MODULE

EXTREMUM SEEKING CONTROL SYSTEM AND A METHOD FOR CONTROLLING A SYSTEM

TECHNICAL FIELD

The present disclosure relates generally to control systems and more particularly to an extremum seeking control system and a method for controlling a system.

BACKGROUND

Extremum seeking controllers (ESCs) are used for real-time optimization of dynamic systems in a model-free manner. Extremum seeking control is a form of model-free adaptive control for the real-time optimization of dynamic systems. The ESC uses a frequency domain approach in which a sinusoidal excitation signal and an averaging filter are used to estimate a gradient of an unknown cost function, which is integrated until an optimal point is reached.

One of main challenges of the ESC is that the gradient of the unknown cost function must be estimated from data gathered while the system is in operation. To ameliorate this issue, a separation of time-scales is used. For instance, a gradient estimator often has a slower bandwidth than the system, so that the system can settle and the cost can be measured near a desired equilibrium. Similarly, a controller of the system often has a slower bandwidth than the gradient estimator to allow the gradient estimate to converge. In some ESC formulations, the separation of time-scales is explicit; that is, the ESC switches between an exploration and exploitation mode. A disadvantage of the separation of time-scales is that the system exhibits slow convergence to the desired equilibrium.

Accordingly, there is a need for a system and a method to accelerate the convergence of the ESC.

SUMMARY

It is an object of some embodiments to accelerate convergence of extremum-seeking controller (ESC). The ESC is configured to drive a system to an equilibrium that optimizes, e.g., maximizes or minimizes, a cost function. Examples of the systems controlled by ESC include a drone, an autonomous vehicle, a robot, and an HVAC system. Some embodiments aim to formulate a step-size adaptation mechanism for accelerating convergence based on quality of a gradient estimate. It is also an objective of some embodiments to determine an optimal reference such that the system converges to an equilibrium state that optimizes the cost function of the system.

The ESC includes a control law that determines an intermediate optimal reference in a direction of an optimal reference. Further, the intermediate optimal reference is applied as a set-point to a feedback controller to change the system output to the intermediate optimal reference. The set-point refers to a desired value of a variable of the system. For example, if the system is the HVAC system, the set-points may include one or more of a speed of an indoor fan, a speed of an outdoor fan, a position of an expansion valve, a speed of the compressor, and the like. In another example, if the system is the autonomous vehicle, then the set-point may correspond to a velocity of the autonomous vehicle.

However, due to dynamics (or transients) of the system, the system output may not be changed to the intermediate optimal reference instantaneously. The system achieves the intermediate optimal reference in a delayed manner (for example, in steps).

While the system is achieving the intermediate optimal reference, there exists a difference between the system output and a current reference. Such a difference is referred to as 'a tracking error'. Further, while the system is achieving the intermediate optimal reference, the system output also changes at each time instant. Therefore, a difference exists between consecutive measured system outputs. For example, a difference exists between system output measured at current time instant and a system output measured at a previous and/or next time instant.

Further, some embodiments are based on objective of estimating a gradient. However, the cost function is unknown, i.e. no analytical form of the cost function is available. Thus, the gradient cannot be estimated analytically. Some embodiments are based on recognition that the gradient can be estimated numerically based on consecutive measurements of cost values. Specifically, some embodiments are based on realization that it is beneficial to estimate the gradient based on the tracking error as well as measurement of a change in the system output (i.e., a difference between consecutive measurements of the system output) and measurement of a change in the cost function. Because incorporating the measurements of the change of both the system output and the cost function reduces need for a separation of time-scales between the system and the gradient estimation, resulting in faster closed-loop convergence of the ESC. Further, it is assumed that the cost function is a function of the system outputs, which correspond to plant or system equilibria. For example, consider a GPS equipped drone searching for a source of a chemical leak. The aforesaid assumption means that a detected chemical concentration is solely a function of a position of the drone, and not its velocity. Therefore, the GPS equipped drone can continuously sample a chemical plume without a need to slow-down or stop before taking a measurement of the chemical concentration. Such a drone process results in faster convergence to the source since the drone does not need to repeatedly accelerate and decelerate.

Some embodiments are based on recognition that the estimated gradient may not be reliable, since the measurements of the change of both the system output and the cost function are susceptible to noise. Therefore, the estimated gradient may not be directly used for step-size adaptation for the ESC. The step-size corresponds to a magnitude of a change of the set-point based on the estimated gradient. The estimated gradient determines a direction of the change of the set-point.

Some embodiments are based on realization the step size can be adapted based on quality of the estimated gradient. To that end, some embodiments are based on objective of determining a quality metric that defines quality of the estimated gradient. In an embodiment, the quality metric is defined by a ratio of a covariance of the estimated gradient and the estimated gradient. According to an embodiment, the covariance of the estimated gradient can be determined based on a weight and the measurement of the change of the system output (i.e., a difference between measured system outputs).

In an embodiment, the weight is determined based on the tracking error and the measurement of the change of the system output. Some embodiments are based on recognition that the tracking error and the system output, individually or in combination, indicate dynamic response and/or magnitude of transients of the system. Such information may indicate likelihood of achieving the optimal reference or the optimal set-point value. For example, if the magnitude of the transient is high, then the system may overshoot a desired reference, and if the magnitude of the transient is low, then the system may not overshoot the desired reference. To that end, some embodiments use the tracking error and the difference between the consecutive measurements of the system output to determine the weight. According to an embodiment, the weights are given to the measured system outputs or the difference between the consecutive measurements of the system output used for determining the covariance. A value of the weight indicates quality of data (e.g., the tracking error and the difference between the consecutive measurements of the system output) used to estimate the gradient. For example, the weight having small value indicates that the data used to estimate the gradient is unreliable and effect of that data may be less in the gradient estimation.

The ratio of the covariance to the estimated gradient corresponds to a 'noise-to-signal ratio'. According to an embodiment, the step size can be adapted based on the ratio of the covariance to the estimated gradient (i.e., the quality of the estimated gradient). For example, if the ratio of the covariance to the estimated gradient is large, then the estimated gradient is contemplated as uncertain. Consequently, the step-size is reduced. Conversely, if the ratio of the covariance to the estimated gradient is small, then the estimated gradient is contemplated as reliable and can be used for aggressive controlling by the ESC. Consequently, the step-size is increased.

According to an embodiment, the adapted step-size and a step-size threshold dictate mode and aggressiveness of the ESC. The step-size threshold is defined by a user. If the adapted step size is smaller than the step-size threshold, then the ESC enters into an exploration mode where the current reference of the ESC remains constant while a dither signal probes the system to improve the gradient estimate. On the other hand, if the adapted step-size is greater than the step-size threshold, then the ESC enters into an exploitation mode to exploit the estimated gradient.

Therefore, the ESC determines the intermediate optimal reference based on a direction governed by the estimated gradient and a magnitude governed by the step-size determined based on the quality of the estimated gradient. Further, ESC iteratively updates the current reference till the optimal reference is determined. Subsequently, the ESC provides an optimal control input (set-point) based on the optimal reference to a feedback controller of the system. The feedback controller operates the system according to the optimal control input, thereby optimizing performance of the system.

Accordingly one embodiment discloses an extremum seeking control system for controlling a system. The extremum seeking control system comprises an input interface configured to receive a tracking error, consecutive measurements of a system output, and consecutive measurements of a cost function of the system, wherein the tracking error is a difference between a set-point of the system and a measurement of the system output; a step-size adapter configured to: estimate a gradient indicating a direction of change of a set-point of the system, based on the tracking error, the consecutive measurements of the system output, and the consecutive measurements of the cost function of the system; determine a weight based on the tracking error and a difference between consecutive measurements of the system output; determine a covariance of the gradient, based on the weight and the difference the consecutive measurements of the system output; and determine a step-size based on a ratio of the covariance of the gradient to the gradient, wherein the step-size corresponds to a magnitude of the change of the set-point of the system; an extremum-seeking controller configured to determine a set-point optimizing performance of the system, based on the direction of the change of the set-point of the system, and the magnitude of the change of the set-point of the system; and a feedback controller configured to control the system based on the set-point optimizing performance of the system.

Accordingly another embodiment discloses an extremum seeking control method for controlling a system. The extremum seeking control method comprises receiving a tracking error, consecutive measurements of a system output, and consecutive measurements of a cost function of the system, wherein the tracking error is a difference between a set-point of the system and a measurement of the system output; estimating a gradient indicating a direction of change of a set-point of the system, based on the tracking error, the consecutive measurements of the system output, and the consecutive measurements of the cost function of the system; determining a weight based on the tracking error and a difference between consecutive measurements of the system output; determining a covariance of the gradient, based on the weight and the difference the consecutive measurements of the system output; determining a step-size based on a ratio of the covariance of the gradient to the gradient, wherein the step-size corresponds to a magnitude of the change of the set-point of the system; determining a set-point optimizing performance of the system, based on the direction of the change of the set-point of the system, and the magnitude of the change of the set-point of the system; and controlling the system based on the set-point optimizing performance of the system.

BRIEF DESCRIPTION OF THE DRAWINGS

FIG. 1B shows tabular column depicting different operation modes in different conditions, according to some embodiments.

FIG. 4 shows a schematic of a gradient estimation by a finite-horizon gradient filter, according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
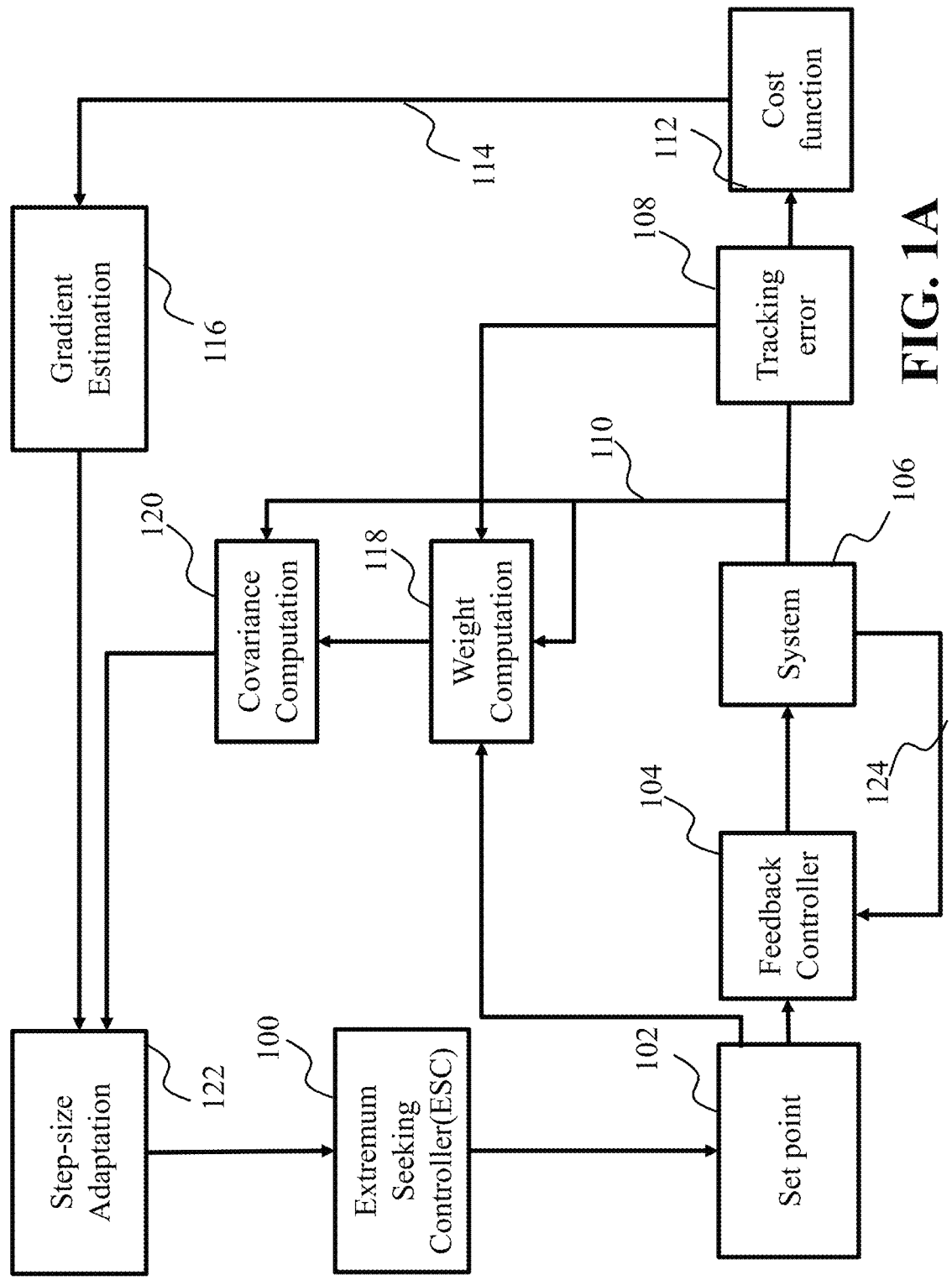
FIG. 1A shows a schematic of principles used for controlling a system, according to some embodiments.

FIG. 1A shows a schematic of principles used for controlling a system 106, according to some embodiments. It is an object of some embodiments to determine an optimal reference such that the system 106 converges to an equilibrium state that optimizes a cost function 112 of the system 106. The system 106 may be a drone, an autonomous vehicle, a robot, or heating, ventilating, and air-conditioning (HVAC) system.

The extremum-seeking controller (ESC) 100 uses a control law that determines an intermediate optimal reference in a direction of an optimal reference (or to find the optimal reference). In various embodiments, the intermediate optimal reference is a value of a state variable of the controlled system 106. Such a value of a state variable is referred herein as a set-point. The intermediate optimal reference is applied as the set-point to a feedback controller 104 to change a system output to the intermediate optimal reference. However, due to dynamics (or transients) of the system 106, the system output may not be changed to the intermediate optimal reference instantaneously. The system 106 achieves the intermediate optimal reference in a delayed manner (for example, in steps).

As used herein, "set-point" refers to a desired value of a variable of the system 106. The term 'set-point' is applied to any particular value of a specific set of control signals, and thermodynamic and operational parameters. For example, if the system 106 is the HVAC system, the set-points may include one or more of a speed of an indoor fan, a speed of an outdoor fan, a position of an expansion valve, a speed of the compressor, and the like. In another example, if the system 106 is the autonomous vehicle, then the set-point may correspond to a velocity of the autonomous vehicle.

While the system 106 is achieving the intermediate optimal reference, there exists a difference between a system output 110 and a current reference, such as the intermediate optimal reference (or the set-point). Such a difference is referred to as 'a tracking error' 108. Further, while the system 106 is achieving the intermediate optimal reference, the system output 110 also changes at each time instant. Therefore, a system outputs difference exists between consecutive measurements of the system output. For example, a difference exists between system output measured at current time instant and a system output measured at a previous time instant.

Further, a step-size adapter (not shown in the figure) is configured to estimate a gradient 116. However, the cost function 112 is unknown, i.e. no analytical form of the cost function 112 is available. Thus, the gradient 116 cannot be estimated analytically. Some embodiments are based on recognition that the gradient 116 can be estimated numerically based on consecutive measurements of cost values. Specifically, some embodiments are based on realization that it is beneficial to estimate the gradient 116, by the step-size adapter, based on the tracking error 108 as well as measurement of a change in the system output 110 (i.e., a difference between consecutive measurements of the system output 110) and measurement of a change 114 in the cost function 112. Because incorporating the measurements of the change of both the system output 110 and the cost function 112 reduces need for a separation of time-scales between the system 106 and the gradient 116 estimation, resulting in faster closed-loop convergence of the ESC 100. Further, it is assumed that the cost function 112 is a function of the system outputs, which correspond to plant or system equilibria. For example, consider a GPS equipped drone searching for a source of a chemical leak. The aforesaid assumption means that a detected chemical concentration is solely a function of a position of the drone, and not its velocity. Therefore, the GPS equipped drone can continuously sample a chemical plume without a need to slow-down or stop before taking a measurement of the chemical concentration. Such a drone process results in faster convergence to the source since the drone does not need to repeatedly accelerate and decelerate.

Some embodiments are based on recognition that the estimated gradient 116 may not be reliable, since the measurements of the change of both the system output 110 and the cost function 112 are susceptible to noise. Therefore, the estimated gradient 116 may not be directly used for step-size adaptation 122 for the ESC 100. The step-size corresponds to a magnitude of a change of the set-point based on the estimated gradient 116. The estimated gradient 116 determines a direction of the change of the set-point.

Some embodiments are based on realization the step size can be adapted based on quality of the estimated gradient 116. To that end, some embodiments are based on objective of determining a quality metric that defines quality of the estimated gradient 116. In an embodiment, the quality metric is defined by a ratio of a covariance 120 of the estimated gradient 116 and the estimated gradient 116. According to an embodiment, the step-size adapter is configured to determine the covariance 120 of the estimated gradient 116 based on a weight 118 and the measurement of the change of the system output 110 (i.e., a difference between the consecutive measurements of the system output 110).

In an embodiment, the step-size adapter determines the weight 118 based on the tracking error 108 and the measurement of the change of the system output 110. Some embodiments are based on recognition that the tracking error 108 and the system output 110, individually or in combination, indicate dynamic response and/or magnitude of transients of the system 106. Such information may indicate likelihood of achieving the optimal reference or the optimal set-point value. For example, if the magnitude of the transient is high, then the system 106 may overshoot a desired reference, and if the magnitude of the transient is low, then the system 106 may not overshoot the desired reference. To that end, the step-size adapter determines the weight 118 using the tracking error 108 and the difference between the consecutive measurements of the system output. According to an embodiment, the weights 118 are given to the measured system outputs or the difference between the consecutive measurements of the system output used for determining the covariance 120. A value of the weight 118 indicates quality of data (e.g., the tracking error 108 and the difference between the consecutive measurements of the system output) used to estimate the gradient 116. For example, the weight 118 having small value indicates that the data used to estimate the gradient 116 is unreliable and effect of that data may be less in the gradient estimation 116. The ratio of the covariance 120 to the estimated gradient 116 corresponds to a 'noise-to-signal ratio'. The step-size adapter is further configured to determine the step size can be adapted 122 based on the ratio of the covariance 120 to the estimated gradient 116 (i.e., the quality of the estimated gradient 116). For example, if the ratio of the covariance 120 to the estimated gradient 116 is large, then the estimated gradient 116 is contemplated as uncertain. Consequently, the step-size is reduced. Conversely, if the ratio of the covariance 120 to the estimated gradient 116 is small, then the estimated gradient 116 is contemplated as reliable and can be used for aggressive controlling by the ESC 100. Consequently, the step-size is increased.

According to an embodiment, the adapted step-size and a step-size threshold dictate mode and aggressiveness of the ESC 100. FIG. 1B shows tabular column depicting different operation modes in different conditions, according to some embodiments. The step-size threshold is defined by a user. If the adapted step size is smaller than the step-size threshold, then the ESC 100 enters into an exploration mode where the current reference remains constant while a dither signal probes the system 106 to improve the gradient estimate. On the other hand, if the adapted step-size is greater than the step-size threshold, then the ESC 100 enters into an exploitation mode to exploit the estimated gradient 116.

Therefore, the ESC 100 determines a set-point 104 (or the intermediate optimal reference) based on a direction governed by the estimated gradient 116 and a magnitude governed by the step-size determined based on the quality of the estimated gradient 116. According to an embodiment, when the system is operated according to the set-point 104, performance of the system 106 is optimized. Further, in a similar manner, in some embodiments, the ESC 100 recursively updates the set-point 104 till the optimal reference is determined. With each recursive update, the estimated gradient 116 becomes smaller. Consequently, after a number of iterations, the recursive upgradation of the current reference is terminated and the optimal reference is determined. In some implementations, a threshold may be set on the gradient estimate to terminate the recursive update. For example, if a norm of the estimated gradient 116 is less than the threshold, then the adapted step-size may become zero which will terminate the recursive update.

According to an embodiment, the determined optimal reference is such that when the system 106 is operated based on the determined optimal reference, the system 106 achieves an equilibrium state that optimizes the cost function of the system 106. The ESC 100 provides an optimal control input (or optimal set-point) based on the optimal reference to the feedback controller 104 of the system 106.

The feedback controller 104 operates the system 106 according to the optimal set-point. Specifically, the feedback controller 104 measures the system output (or a process variable). The measured value is applied as feedback signal 124 to the feedback controller 104. The feedback controller 104 computes an error signal as a difference between the optimal set-point and the feedback signal 124. The feedback controller 104 uses control parameters such as a proportional gain, an integral term, and/or a derivative term. The control parameters may be applied to the error signal to determine an input for the system 106 to drive the process variable or the system output according to the optimal set-point.

Figure 2:
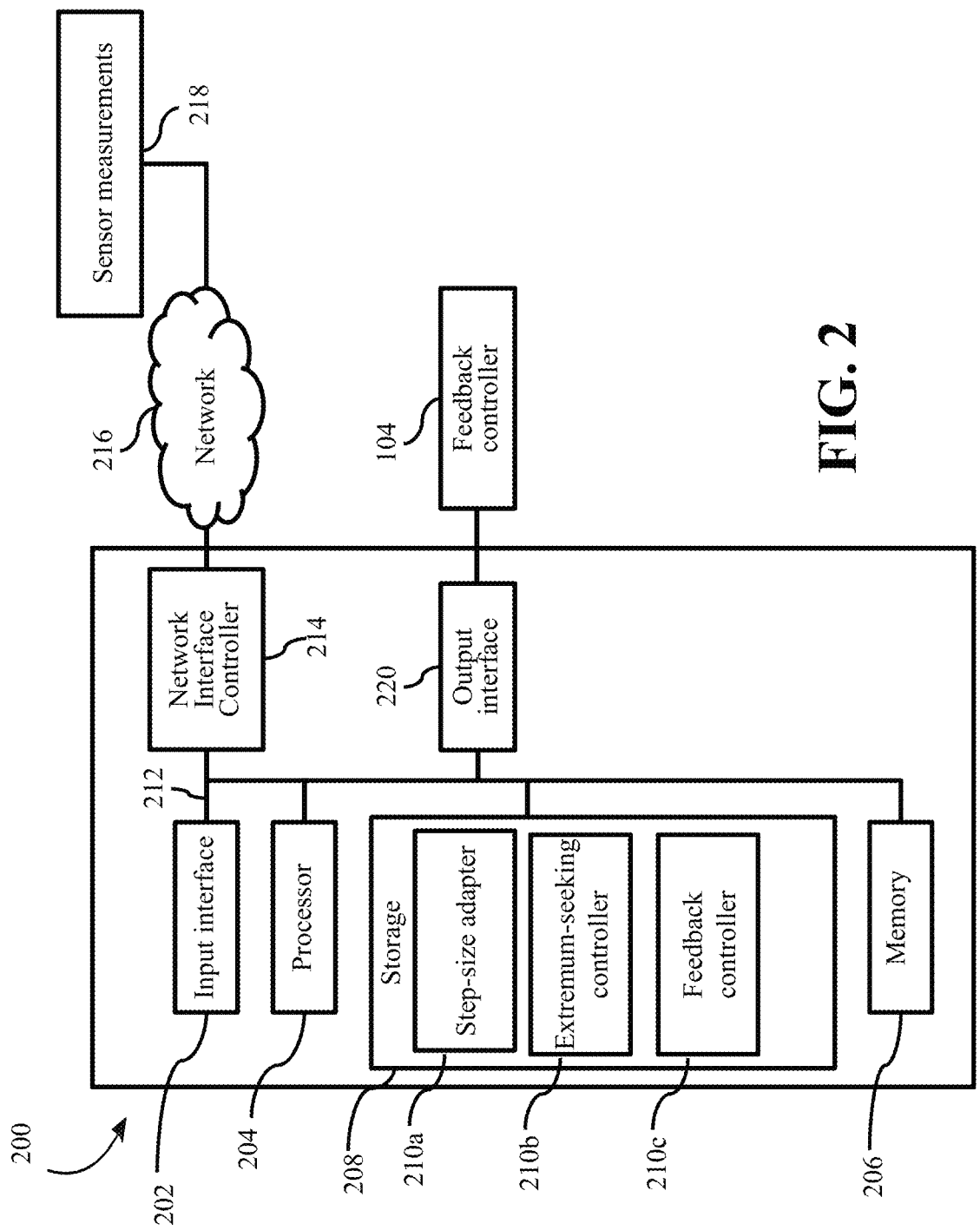
FIG. 2 shows a block diagram of an extremum seeking control system for controlling the system, according to some embodiments.

FIG. 2 shows a block diagram of an extremum seeking control system 200 for controlling the system 106, according to some embodiments. The extremum seeking control system 200 can have a number of interfaces connecting the extremum seeking control system 200 with other systems and devices. For example, a network interface controller (NIC) 214 is adapted to connect the extremum seeking control system 200, through a bus 212, to a network 216. Through the network 216, either wirelessly or through wires, the extremum seeking control system 200 may receive system measurements 218. The system measurements 218 include one or more of the tracking error, consecutive measurements of the system output, and consecutive measurements of the cost function of the system 106. The consecutive measurements of the system output includes system outputs at different time instants, e.g., the system output at the current time instant and the system output at a previous time instant.

In an embodiment, based on the consecutive measurements of the system output, the change in the system output can be determined, and based on the consecutive measurements of the system output, the change in the cost function of the system 106 can be determined. Additionally or alternatively, the system measurements 218 may be obtained via an input interface 202.

The extremum seeking control system 200 includes a processor 204 configured to execute stored instructions, as well as a memory 206 that stores instructions that are executable by the processor 204. The processor 204 can be a single core processor, a multi-core processor, a computing cluster, or any number of other configurations. The memory 206 can include random access memory (RAM), read only memory (ROM), flash memory, or any other suitable memory systems. The processor 204 is connected through the bus 212 to one or more input and output devices. Further, the extremum seeking control system 200 includes a storage device 208 adapted to store different modules storing executable instructions for the processor 204. The storage device 208 can be implemented using a hard drive, an optical drive, a thumb drive, an array of drives, or any combinations thereof.

The storage device 208 is configured to store a a step-size adapter 210a, and an extremum-seeking controller 210b The step-size adapter 210a is configured to: estimate a gradient indicating a direction of change of a set-point of the system, based on the tracking error, the consecutive measurements of the system output, and the consecutive measurements of the cost function of the system. The step-size adapter 210a is further configured to determine a weight based on the tracking error and a difference between consecutive measurements of the system output, and determine a covariance of the gradient, based on the weight and the difference between the consecutive measurements of the system output. The step-size adapter 210a is further configured to determine a step-size based on a ratio of the covariance of the gradient to the gradient, wherein the step-size corresponds to a magnitude of the change of the set-point of the system. The extremum-seeking controller 210b is configured to determine a set-point optimizing performance of the system, based on the direction of the change of the set-point of the system, and the magnitude of the change of the set-point of the system.

In some embodiments, the storage device 208 may store a feedback controller 210c. The feedback controller 210c is configured to control the system based on the set-point optimizing performance of the system. In some other embodiments, the feedback controller 104, which is an implementation of the feedback controller 210c, may be connected externally to the system 200. In such embodiments, the feedback controller 210c may not be stored in the storage device 208. The feedback controller 104 may correspond to a proportional-integral-derivative (PID) controller.

Additionally, the extremum seeking control system 200 may include an output interface 220. In some implementations, the extremum seeking control system 200 is further configured to submit, via the output interface 220, the set-point to the feedback controller 104 to control the system 106 based on the set-point.

According to an embodiment, the system 106 is a discrete-time nonlinear system whose closed-form system description can be written as $$x_{t+1} = f(x_t, u_t) \quad (1a)$$

$$y_t = h(x_t, u_t) \quad (1b)$$

where $x_t \in \mathbb{R}^{n_x}$ is a state, $u_t \in \mathbb{R}^{n_u}$ is a control input, and $y_t \in \mathbb{R}^{n_y}$ is the measured system output. The system 106 with the feedback controller 104 is also referred to as a plant. It is assumed that the measured system outputs y are homeomorphic to equilibrium states of the plant i.e., h is a homeomorphism between y and $\{\bar{x}: \exists \bar{u}, \bar{x}=f(\bar{x}, \bar{u})\}$. Furthermore, it is assumed that $h^{-1}$ is Lipschitz continuous.

The system 106 models a closed-loop tracking system for tracking setpoint (such as set-point). Thus, it can be assumed that the system is input-to-state stable (ISS) and the system output y asymptotically tracks $y_t \to \bar{r}$ for constant references $u_t = \bar{r}$. The tracking assumption $y_t \to \bar{r}$ is considered for notational simplicity and without loss of generality. A steady-state cost $\ell(u) = J(g(u))$ measured by a performance calculator with respect to the input u depends on a steady-state map $g(\cdot) = h(\pi(\cdot), \cdot)$ where $\pi(\cdot)$ maps each input u to a unique equilibrium state $\bar{x} = \pi(u)$. Some embodiments are based on recognition that the inputs $u = g^{-1}(r)$ can be transformed to produce a plant (1) whose steady-state map is an identity map, because g is invertible as both h and it are invertible. This simplifies notation since $\nabla_r J (g(g^{-1}(r))) = \nabla_y J$ instead of $\nabla_u \ell = \nabla_y J_u h + \nabla_y J \nabla_x h \nabla \pi$. According to some embodiments, the performance calculator is an energy meter that determines an energy efficiency of a closed-loop HVAC system.

Some embodiments are based on objective of determining a reference $u_t = r^*$ such that the plant converges to the equilibrium state $x^*$ which optimizes an unknown cost function $(x^*, r^*) = \arg\min J(h(\bar{x}, \bar{r}))$ subject to: $\bar{x} = f(\bar{x}, \bar{r})$.

Figure 3:
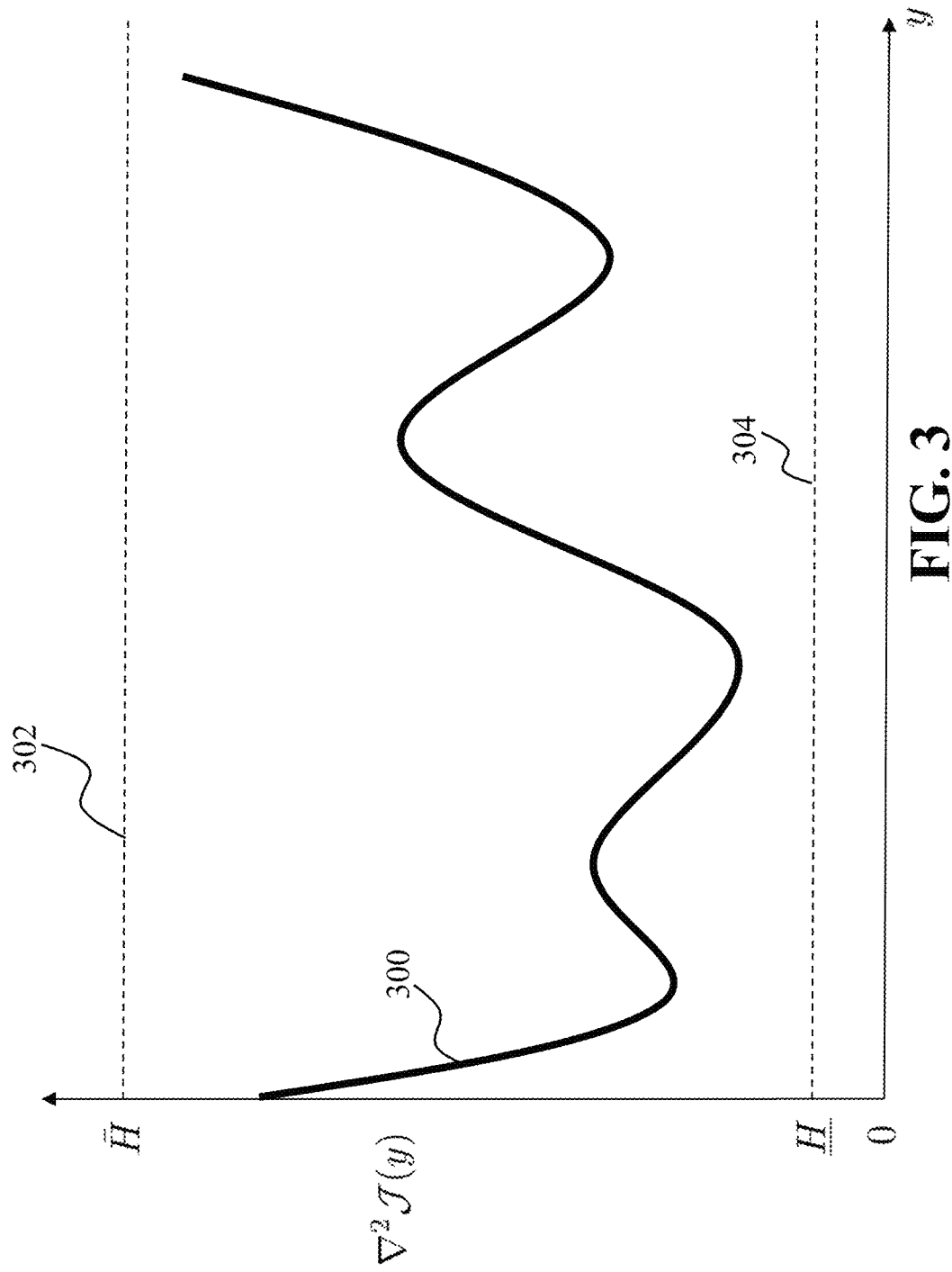
FIG. 3 illustrates an unknown cost function of the system, according to some embodiments.

FIG. 3 illustrates the unknown cost function of the system 106, according to some embodiments. A curvature 300 of the unknown cost function is bounded by a lower bound 304 $\underline{H} = \underline{h}I$ and an upper bound 302 $\overline{H} = \overline{h}I$. It is assumed that the bounds $\underline{H} \preceq \nabla^2 J(y) \preceq \overline{H}$ on the curvature 300 of the unknown cost function are known, where the unknown cost is function strictly convex, i.e., the lower bound 304 $\underline{H} \succ 0$ and gradient $\nabla J$ is Lipschitz continuous, therefore the upper bound 302 $\overline{H} \prec \infty$. The lower bound 304 $\underline{H} = \underline{h}I$ and the upper bound 302 $\overline{H} = \overline{h}I$ may be scalar. Additionally, some embodiments can exploit additional information provided by matrix bounds, if available.

The extremum seeking controller (ESC) 100 includes the control law given by $$r_{t+1} = r_t + \begin{cases} -\alpha_t K \hat{\theta}_t & \text{if } \alpha_t \geq \underline{\alpha} \\ 0 & \text{otherwise} \end{cases} \quad (2)$$

$$u_t = r_t + d_t$$

where a state $r_t$ of the extremum seeking controller 100 is a current estimate of the optimal reference $r^*$, $u_t$ is an input and $d_t$ is a dither signal for exploration and to ensure excitation in dynamics. A scalar $\underline{\alpha} \in (0, 1)$ is a user-defined step-size threshold that dictates whether the extremum seeking controller 100 exploits gradient information or explores in a search space.

According to some embodiments, a gain $K = K^T \succ 0$ in the control law of the ESC satisfies a matrix inequality $K - K^T (\overline{H} + 2G^T PG) K \preceq 0$.

In an embodiment, $K = (\overline{H} + 2G^T PG)^{-1}$ where $P \preceq \nabla_x^2 V - I$ is an upper-bound on a curvature of a smooth Lyapunov function for the plant (1) and G is input-to-state gain of the system 106, that is, $\|\bar{x}_1 - \bar{x}_2\| = \|h^{-1}(\bar{u}_1) - h^{-1}(\bar{u}_2)\| \leq \|G(\bar{u}_1 - \bar{u}_2)\|$.

According to an embodiment, $G = gI$, which implies that g is a Lipschitz constant of $h^{-1}$.

In some embodiments, the plant (1) is linear time-invariant, so $G = (I - A)^{-1} B$ and P satisfies $A^T (P - I) A - (P - I) = -Q$ for a matrix $Q \succ 0$.

In another embodiment, the plant (1) has trivial dynamics, therefore $G = 0$ and the gain $K = \frac{1}{2} \overline{H}$, which is suitable for an (non-dynamic) optimization problem. For a dynamic plant $G \neq 0$, the gain K incorporates information of both the plant (1) and the optimization problem to improve convergence.

FIG. 4 shows a schematic of gradient estimation by a finite-horizon gradient filter 400, according to some embodiments. A gradient $\theta_t = \nabla J(r_t)$ of the unknown cost function at the current reference $r_t$ is estimated by using the finite-horizon gradient filter 400. The finite-horizon gradient filter 400 operates in the batch-least-squares (BLS) manner with a covariance 402 given by $$\Lambda_t^{-1} = \frac{1}{N} \sum_{k=t-1}^{t-N} \frac{\Delta y_k \Delta y_k^T}{w_k}$$

and a gradient estimate 404 given by $$\hat{\theta}_t = \frac{1}{N} \sum_{k=t-1}^{t-N} \Lambda_t \frac{\Delta y_k}{w_k} \left( \Delta J_k - \Delta y_k^T \hat{H} \left( e_t + \frac{1}{2} \Delta y_k \right) \right)$$

where $\Delta y_k = y_t - y_k$ and $\Delta \mathcal{J}_k = \mathcal{J}(y_t) - \mathcal{J}(y_k)$ are changes in the measurements of the system outputs and the unknown cost function, respectively, and a batch horizon N is at least $n_y$ long. The finite-horizon gradient filter 400 requires that the output $y_t$ of the plant (1) is persistently exciting, which can be achieved using the dither signal $d_t$.

The gradient estimate 404 includes a correction term 406. The correction term 406 compensates for the tracking error $e_t = y_t - r_t$ and a nominal curvature $\frac{1}{2}\Delta y_k^T \hat{H} \Delta y_k$ where $\hat{H} = \frac{1}{2}(\overline{H} + \underline{H})$ is a median curvature $\nabla^2 \mathcal{J}$ of the unknown cost function ($\mathcal{J}$) based on the lower bound 304 $\underline{H} = \underline{h}I$ and the upper bound 302 $\overline{H} = \overline{h}I$. The covariance 402 and the gradient estimate 404 correspond to the variance 118 and the gradient 116 shown in FIG. 1, respectively.

In some embodiments, the tracking errors $\|e_t\| \gg 1$ and transients $\|\Delta y_k\| \gg 1$ are large, weighting is small $w_k \ll 1$, indicating that a data-point $(\Delta y_k, \Delta \mathcal{J}_k)$ may not provide reliable information about the gradient $\theta = \nabla \mathcal{J}_r$.

The weighting term 408 (i.e., the weight 114) is given by $$w_k = \frac{1}{2}\|\Delta y_k\|(\|\Delta y_k\|_{\tilde{H}} \|e_t\|_{\tilde{H}} + \frac{1}{2}\|\Delta y_k\|_{\tilde{H}})$$

where $\tilde{H} = \overline{H} - \underline{H}$ is a known range of the curvature of the unknown cost function, computed based on the lower bound 304 $\underline{H} = \underline{h}I$ and the upper bound 302 $\overline{H} = \overline{h}I$.

Figure 5:
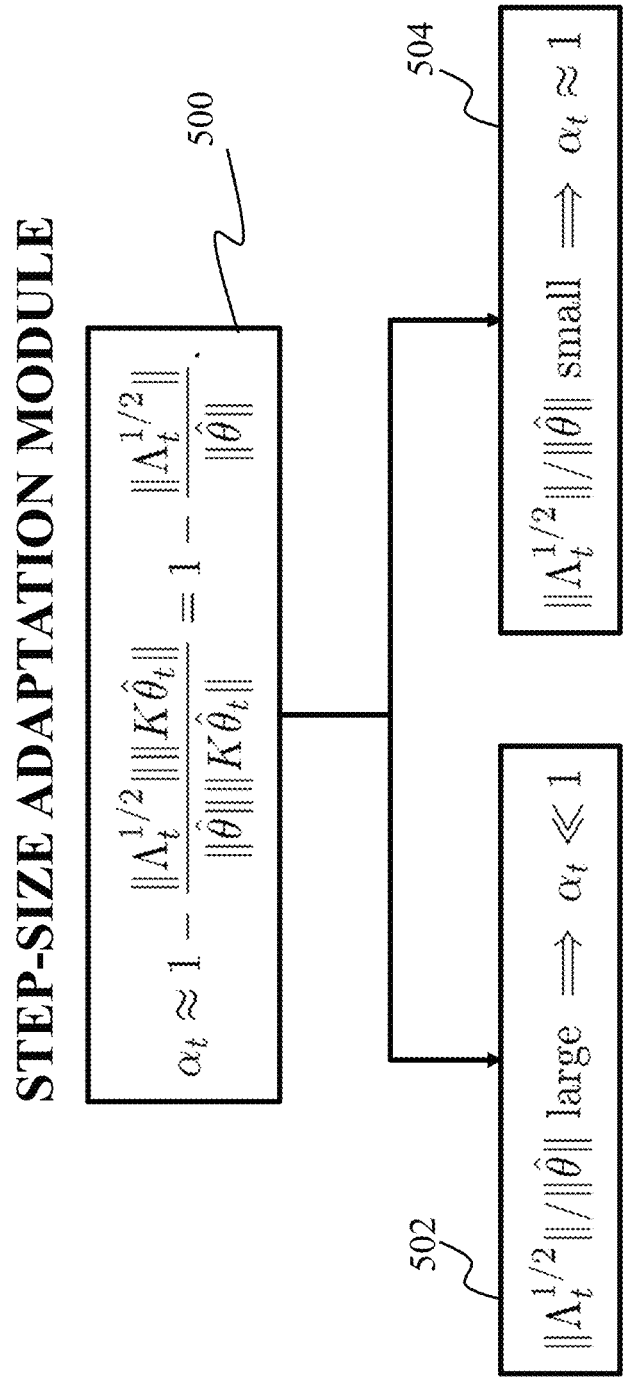
FIG. 5 shows a schematic of step-size adaption based on a noise-to-signal ratio, according to some embodiments.

FIG. 5 shows a schematic of step-size adaption based on the noise-to-signal ratio, according to some embodiments. An adaptive step-size for the ESC 100 is given by $$\alpha_t = \max\left\{0, 1 - \frac{\Lambda_t^{\frac{1}{2}} K \hat{\theta}_r}{\hat{\theta}_t^\top K \hat{\theta}_t}\right\}$$

which dictates the mode and aggressiveness of the ESC 100 based on the quality of the gradient estimate $\hat{\theta}_t$. If the step-size is smaller, that is, $\alpha_t < \underline{\alpha}$, then the ESC 100 enters the exploration mode where the state $r_t$ of the ESC 100 remains constant while the dither signal $d_t$ probes the plant (1) to improve the gradient estimate 404. If the step size is larger, that is, $\alpha_t \geq \underline{\alpha}$, then the ESC 100 descends the gradient estimate $\hat{\theta}_t$ where $K = K^T \succ 0$. Consequently, the aggressiveness of such descent is dictated by the adapted step-size $\alpha_t$. The max operator given in the adaption of the step-size $\alpha_t$ ensures that the step-size is well-defined asymptotically, and always non-negative.

In some embodiments, the gain K and the covariance $\Lambda_t$ are balanced, i.e., $K \approx kI$ and $\Lambda \approx \lambda^2 I$. To that end, the adaptive step-size can be approximated as $$\alpha_t \approx 1 - \frac{\|\Lambda_t^{0.5}\| \|K \hat{\theta}_t\|}{\|\hat{\theta}_t\| \|K \hat{\theta}_t\|} = 1 - \frac{\|\Lambda_t^{0.5}\|}{\|\hat{\theta}_t\|}$$

$$\frac{\|\Lambda_t^{0.5}\|}{\|\hat{\theta}_t\|}$$

is noise-to-signal ratio 500. The noise-to-signal ratio 500 determines the step-size $\alpha_t$.

In some embodiments, the noise-to-signal ratio 500 is small 504, thus $$\frac{\|\Lambda_t^{0.5}\|}{\|\hat{\theta}_t\|} \ll 1,$$

which implies $\alpha_t = 1$, allowing the ESC 100 to aggressively exploit the gradient estimate $\hat{\theta}_t$.

In some other embodiments, the noise-to-signal ratio 500 is large 502, i.e., $$\frac{\|\Lambda_t^{0.5}\|}{\|\hat{\theta}_t\|} \approx 1,$$

then the reduced $\alpha_t \ll 1$ significantly slows the gradient descent. Such adaptive step-size provides a reactive separation of time-scales between the ESC 100 and the gradient estimator (such as finite-horizon gradient filter 400).

Figure 6A:
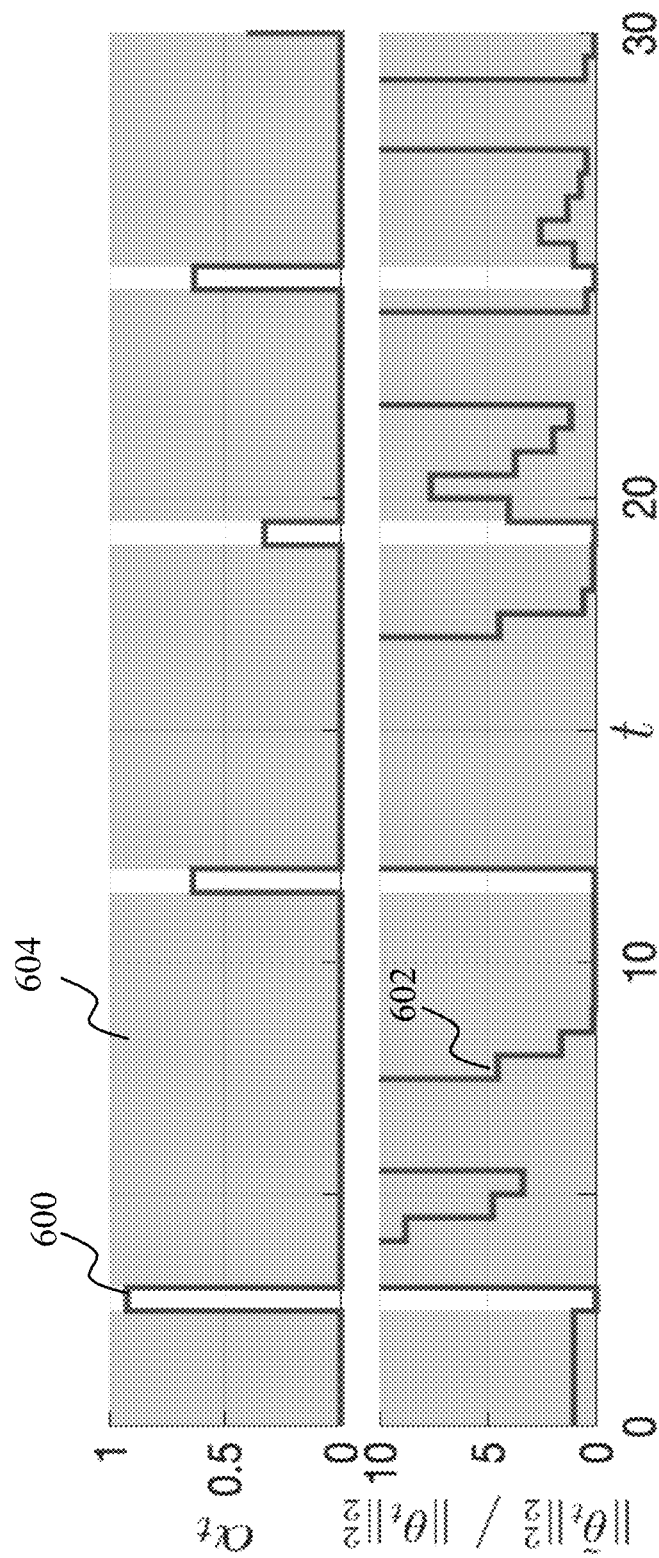
FIG. 6A demonstrates performance of an extremum seeking control (ESC) and a relationship between a step-size and a gradient estimation error, according to some embodiments.

FIG. 6A demonstrates the performance of the ESC 100 and a relationship between the step-size 600 and a gradient estimation error 602, according to some embodiments. Dynamics of the plant (1) are given by $$\dot{x}_1 = -x_1 + u_2^2, \dot{x}_2 = -x_2 + u_1, \dot{x}_3 = -x_3 + u_2 x_2.$$

The unknown cost function is given by $$\mathcal{J}(y) = (x_2 + x_3)^2 + 2(x_1 + x_2 - u_1) = y_1^2 + 2y_2.$$

Although the plant does not satisfy the asymptotic tracking assumption, this can be rectified by inverting a steady-state map of the plant. The plant input $u_t$ in terms of the state $r_t$ is given by $$u_{1,t} = \frac{r_{1,t}}{1 + \sqrt{r_{2,t}}}, u_{2,t} = \sqrt{r_{2,t}}.$$

The plant has an implicit constraint $r_2 \geq 0$, which can be enforced by setting $u_1 = r_1$ and $u_2 = 0$ if $r_2 < 0$.

For ESC design, the plant was converted to discrete-time using a forward Euler method with a sample-time of $\Delta t = 0.5$ s. The gain G and Lyapunov matrix P are computed using parametric linear matrix inequalities with $u_2 \in [-5, 5]$ as a parameter. The bounds on the curvature of the unknown cost function are $\underline{H} = 0$ and $\overline{H} = 10I$. The step-size threshold is $\underline{\alpha} = 0.1$ and batch length is N=5. Initial conditions are $x_0 = [1, 5, 5]^T$ and $r_0 = [5, 1]^T$.

It can be noted from FIG. 6A that the step-size 600 is inversely correlated with the gradient estimation error 602. If the gradient estimation error 602 is large, the ESC enters exploration mode 604 to improve the gradient estimate. However, since the step-size adaptation considers a worst-case estimation error, there are periods during which the ESC enters the exploration mode out of conservativeness. At other times the gradient estimation error 602 is small, and the step-size 600 is large for exploitation.

Figure 6B:
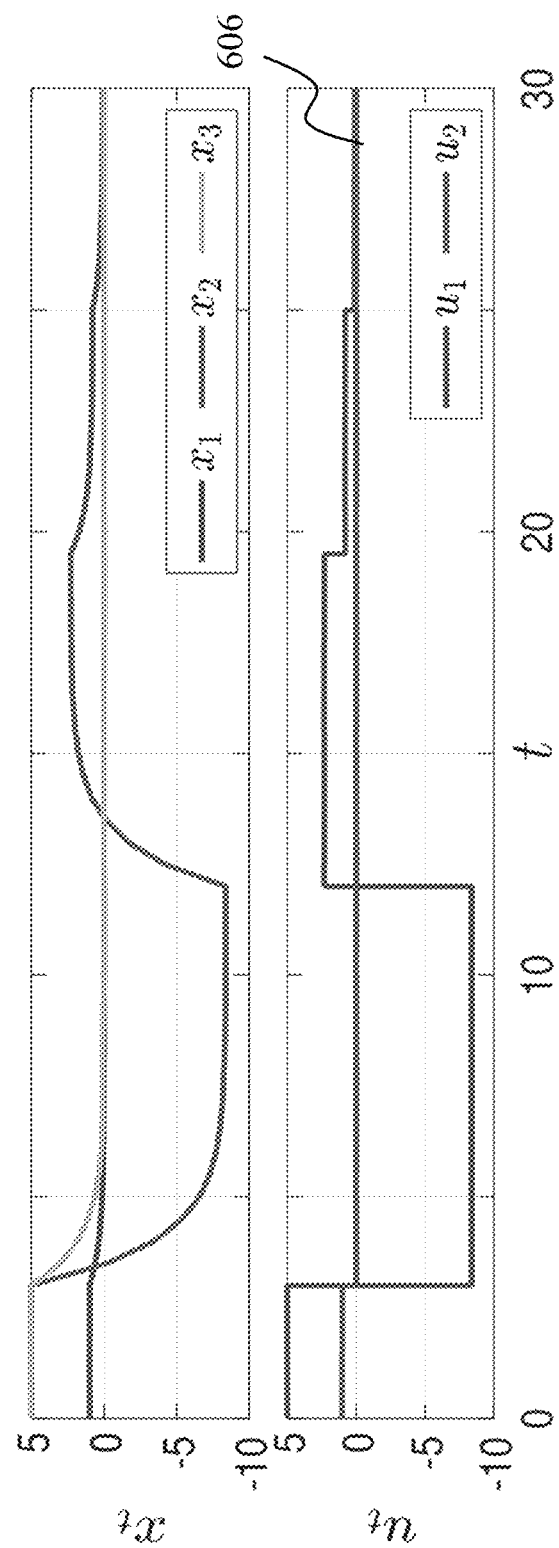
FIG. 6B illustrates states of a plant and inputs of the ESC, according to some embodiments.

FIG. 6B illustrates states $x_t$ of the plant and the inputs $u_t$ of the ESC, according to some embodiments. It can be observed that at the end of simulation time, the state and the inputs are at steady-state, i.e. equilibrium 606 is achieved.

Figure 6C:
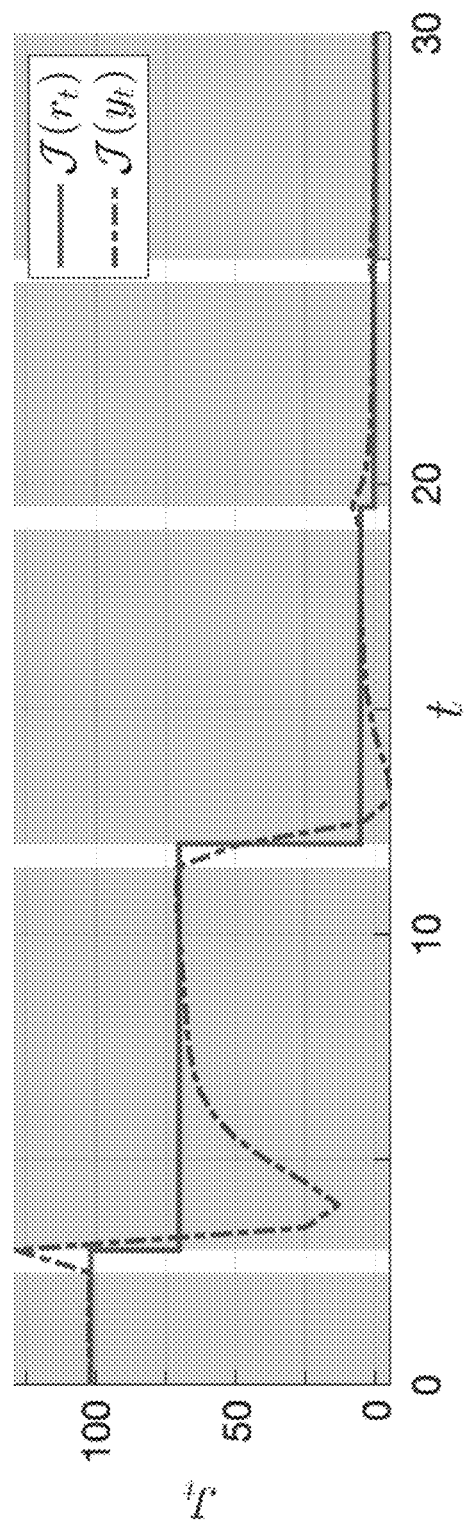
FIG. 6C shows costs associated with an output and a state of the ESC, according to some embodiments.

FIG. 6C shows costs associated with the output $y_t$ and the state $r_t$, according to some embodiments. After each update to the reference $r_{t+1} \neq r_t$, the ESC enters the exploration mode while transient response settles, allowing the gradient estimate to improve. It can be noted that amount of time the ESC spends in the exploration mode decreases as size of the transients decreases.

Figure 7:
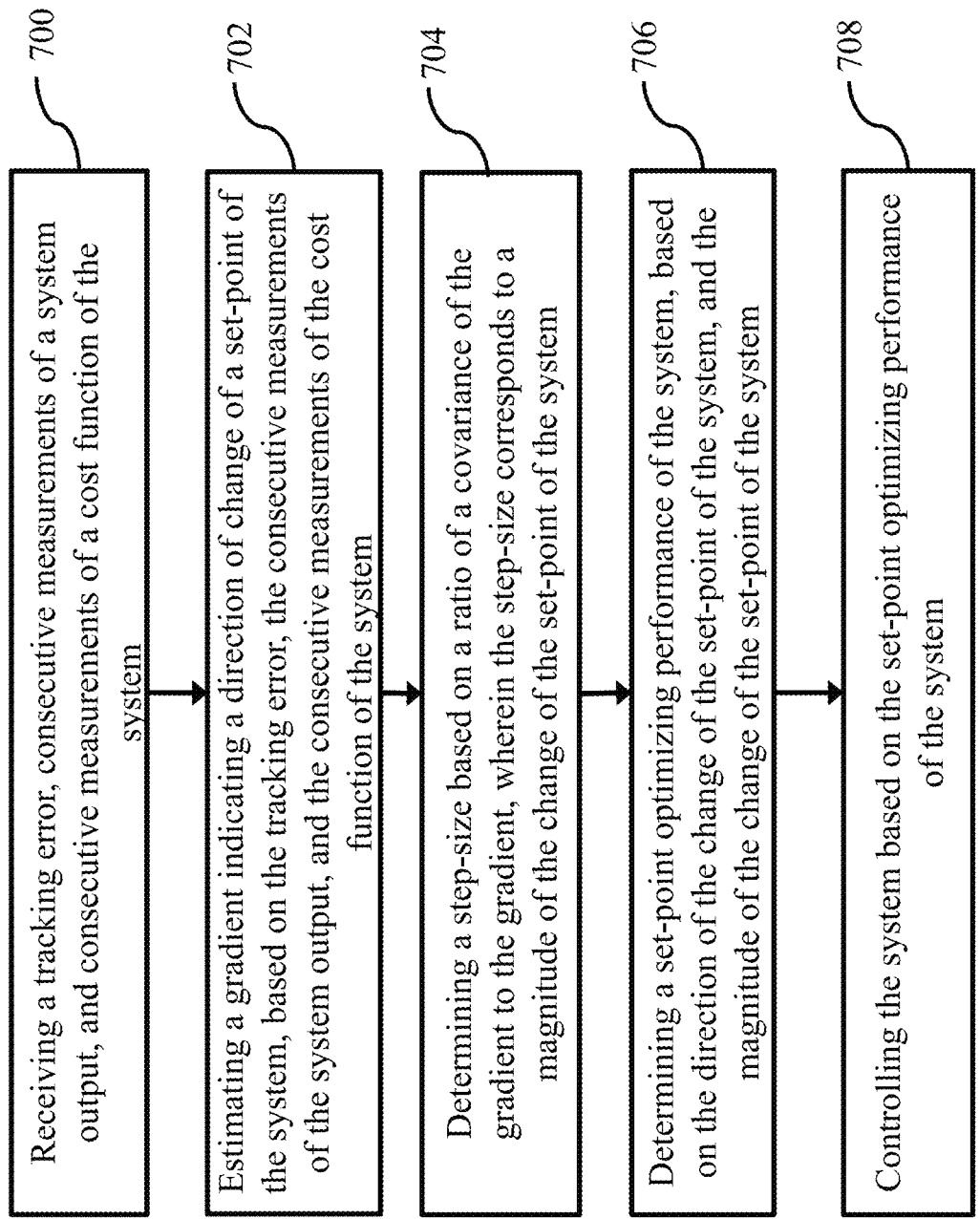
FIG. 7 shows a block diagram of an extremum seeking control method for controlling the system, according to some embodiments.

FIG. 7 shows a block diagram of an extremum seeking control method for controlling the system 106, according to some embodiments. At block 700, the extremum seeking control method includes receiving the tracking error, the consecutive measurements of the system output, and the consecutive measurements of a cost function of the system 106.

At block 702, the extremum seeking control method includes estimating the gradient indicating a direction of a change of a set-point of the system 106, based on the tracking error, the consecutive measurements of the system output, and the consecutive measurements of the cost function of the system 106.

At block 704, the extremum seeking control method includes determining a step-size based on a ratio of a covariance of the gradient to the gradient. The step-size corresponds to a magnitude of the change of the set-point of the system 106. The covariance of the gradient is determined, based on a weight and the difference the consecutive measurements of the system output. In an embodiment, the weight is determined based on the tracking error and a difference between consecutive measurements of the system output.

At block 706, the extremum seeking control method includes determining a set-point optimizing performance of the system 106, based on the direction of the change of the set-point of the system 106, and the magnitude of the change of the set-point of the system 106.

At block 708, the extremum seeking control method includes controlling the system 106 based on the set-point optimizing performance of the system 106.

Figure 8:
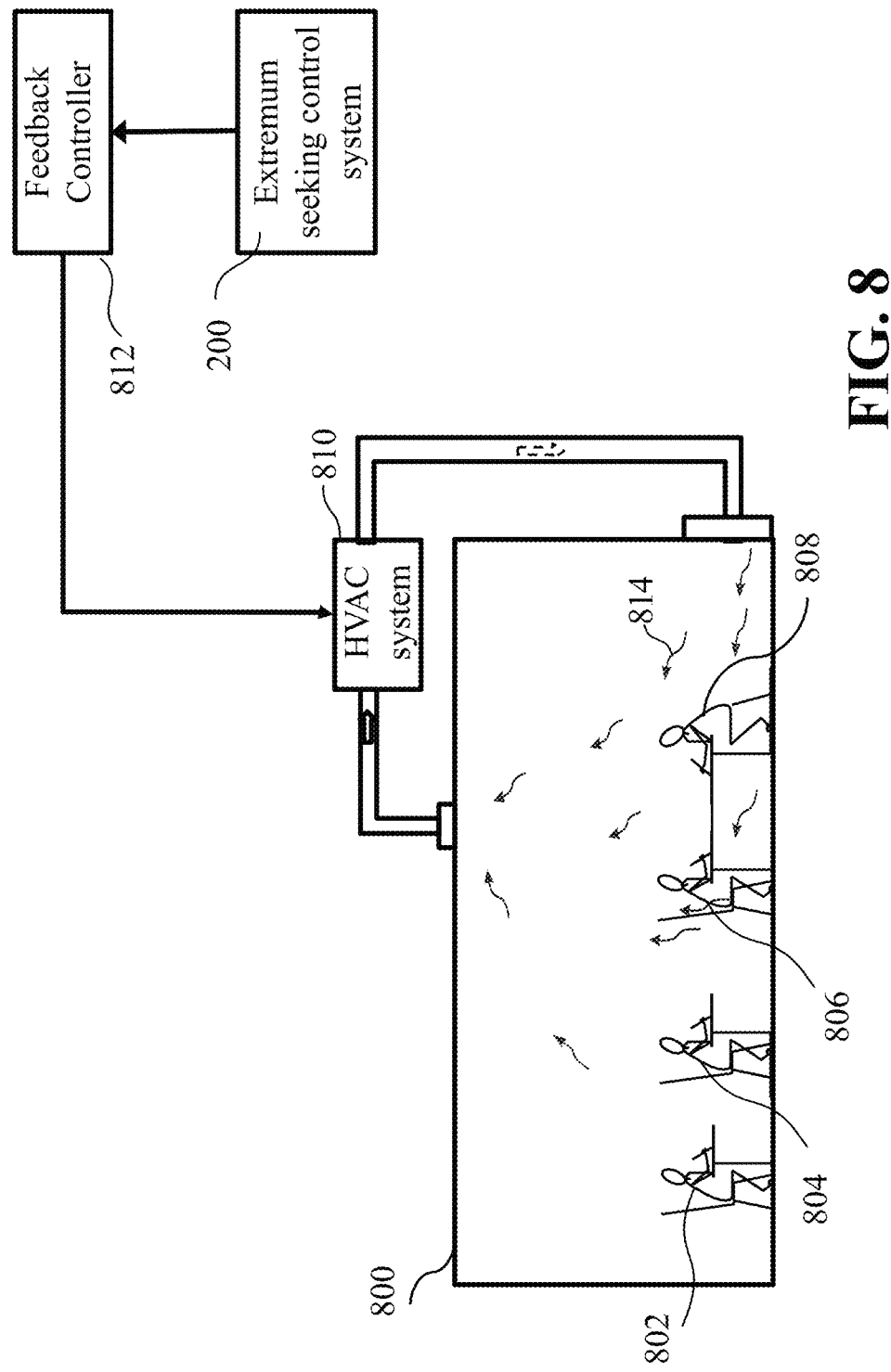
FIG. 8 illustrates controlling of heating, ventilating, and air-conditioning (HVAC system) using the extremum seeking control system, according to some embodiments.

FIG. 8 illustrates controlling of heating, ventilating, and air-conditioning (HVAC system) 810 using the extremum seeking control system 200, according to some embodiments. An "HVAC" system refers to any heating, ventilating, and air-conditioning (HVAC) system implementing the vapor compression cycle. The HVAC system 810 span a very broad set of systems, ranging from systems which supply only outdoor air to occupants of a building, to systems which only control temperature of a building, or to systems which control the temperature and humidity.

The HVAC system 810 is arranged to condition a room 800. The room 802 is occupied by occupants 802, 804, 806 and 808. Arrows 814 represent air supplied by the HVAC system 810 to condition the room 800. The extremum seeking control system 200 determines an optimal set-point with step-size adaption mechanism (as described in FIGS. 1A and 1B). When the HVAC system 810 is operated according to the optimal reference, the HVAC system 810 converges to an equilibrium state that optimizes an unknown cost function of the HVAC system 810. The unknown cost function of the HVAC system 810 may be related to energy consumption of the HVAC system 810. Therefore, according to an embodiment, optimizing the unknown cost function implies optimization of the energy consumption of the HVAC system 810 or performance of the HVAC system 810.

The determined optimal reference is input to a feedback controller 812 associated with the HVAC system 810. The feedback controller 812 is configured to produce control commands corresponding to the optimal reference. The control commands may include a position of an expansion valve of the HVAC system 810, a speed of a compressor HVAC system 810, a speed of an indoor fan of HVAC system 810, a speed of an outdoor fan HVAC system 810, the like. The feedback controller 812 further controls the HVAC system 810 according to the control commands to optimize performance of the HVAC system 810.

Figure 9A:
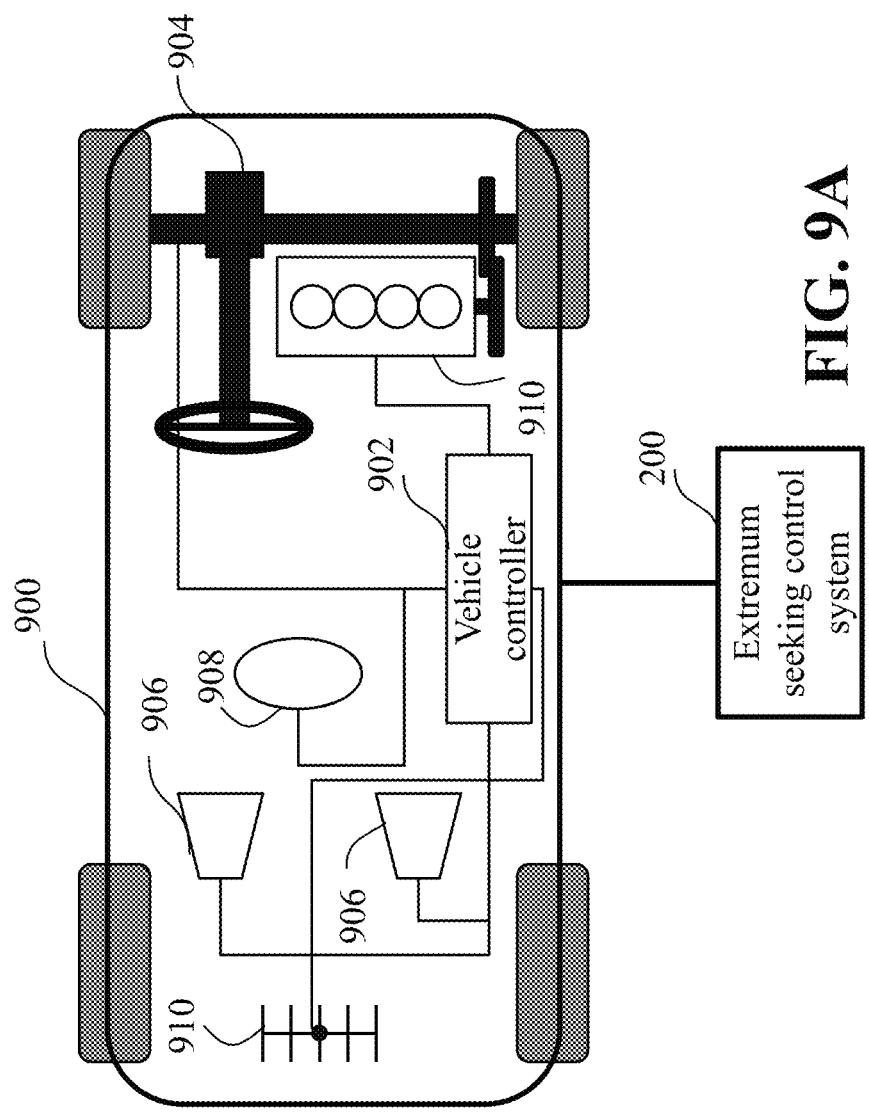
FIG. 9A shows a schematic of a vehicle system including a vehicle controller in communication with the extremum seeking control system employing principles of some embodiments.

FIG. 9A shows a schematic of a vehicle system 900 including a vehicle controller 902 in communication with the extremum seeking control system 200 employing principles of some embodiments. The vehicle system 900 (also referred as vehicle 900) may be any type of wheeled vehicle, such as a passenger car, bus, or rover. Also, the vehicle 900 can be an autonomous or semi-autonomous vehicle. For example, some embodiments control motion of the vehicle 900. Examples of the motion include lateral motion of the vehicle 900 controlled by a steering system 904 of the vehicle 900. In one embodiment, the steering system 904 is controlled by the vehicle controller 902. Additionally or alternatively, the steering system 904 may be controlled by a driver of the vehicle 900.

In some embodiments, the vehicle 900 may include an engine 910, which can be controlled by the vehicle controller 902 or by other components of the vehicle 900. In some embodiments, the vehicle 900 may include an electric motor in place of the engine 910 and can be controlled by the vehicle controller 902 or by other components of the vehicle 900. The vehicle 900 can also include one or more sensors 906 to sense the surrounding environment. Examples of the sensors 906 include distance range finders, such as radars. In some embodiments, the vehicle 900 includes one or more sensors 908 to sense its current motion parameters and internal status. Examples of the one or more sensors 908 include global positioning system (GPS), accelerometers, inertial measurement units, gyroscopes, shaft rotational sensors, torque sensors, deflection sensors, pressure sensor, and flow sensors. The sensors provide information to the vehicle controller 902. The vehicle 900 may be equipped with a transceiver 910 enabling communication capabilities of the vehicle controller 902 through wired or wireless communication channels with the extremum seeking control system 200 of some embodiments.

The extremum seeking control system 200 determines an optimal set-point optimizing performance of the vehicle 900. In an embodiment, optimizing the performance of the vehicle 900 refers to optimizing energy consumption of the vehicle 900. The optimal set-point is input to the vehicle controller 902. The vehicle controller 902 produces control commands corresponding to the optimal set-point.

Figure 9B:
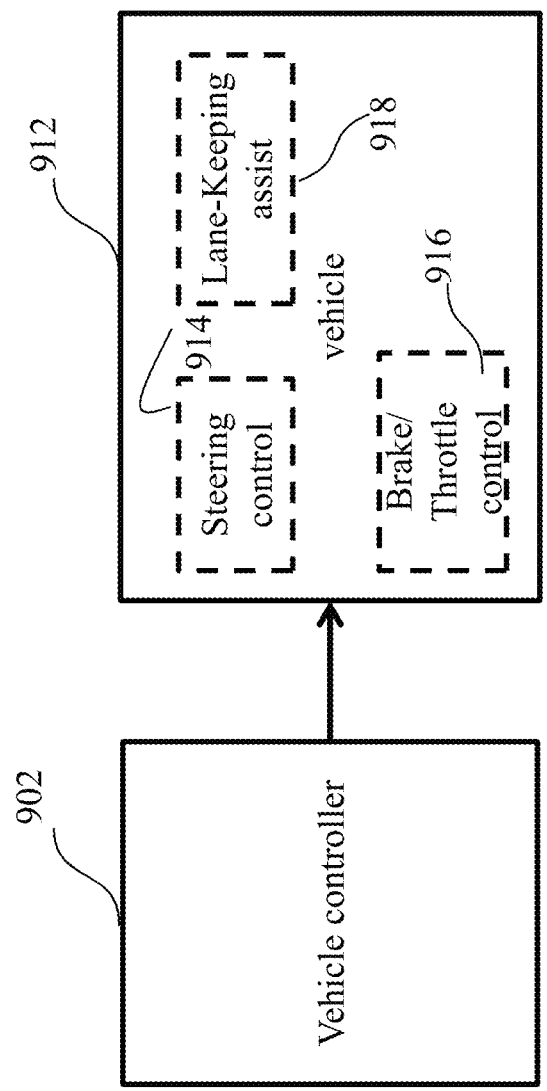
FIG. 9B shows a schematic of interaction between the vehicle controller and other controllers of the vehicle system, according to some embodiments.

FIG. 9B shows a schematic of interaction between the vehicle controller 902 and other controllers 912 of the vehicle 900, according to some embodiments. For example, in some embodiments, the controllers 912 of the vehicle 900 are steering control 914 and brake/throttle controllers 916 that control rotation and acceleration of the vehicle 900. In such a case, the vehicle controller 902 outputs the control commands based on the optimal set-points, to the controllers 914 and 916 to control a kinematic state of the vehicle 900. In some embodiments, the controllers 912 also includes high-level controllers, e.g. a lane-keeping assist controller 918 that further process the control commands of the vehicle controller 902. The controllers 912 utilize the output of the vehicle controller 902 i.e., control commands to control at least one actuator of the vehicle 900, such as the steering wheel and/or the brakes of the vehicle 900, in order to operate the vehicle 900 based the optimal set-point optimizing performance of the vehicle 900.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. An extremum seeking control (ESC) system for controlling a subject system, the ESC system comprising:
at least one processor; and
a memory having instructions stored thereon that, when executed by the at least one processor, cause the ESC system to:
receive a tracking error, consecutive measurements of a system output of the subject system, and consecutive measurements of a cost function of the subject system, wherein the tracking error is a difference between a set-point of the subject system and a measurement of the system output;
estimate a gradient indicating a direction of change of the set-point of the subject system, based on the tracking error, the consecutive measurements of the system output, and the consecutive measurements of the cost function of the subject system;
determine a weight based on the tracking error and a difference between consecutive measurements of the system output;
determine a covariance of the gradient, based on the weight and the difference between the consecutive measurements of the system output;
determine a step-size based on a ratio of the covariance of the gradient to the gradient, wherein the step-size corresponds to a magnitude of the change of the set-point of the subject system; and
determine a set-point optimizing performance of the subject system, based on the direction of the change of the set-point of the subject system, and the magnitude of the change of the set-point of the subject system; and
a feedback controller configured to:
generate one or more control commands defining one or more operational parameters of the subject system, based on the determined set point; and
control the subject system according to the one or more control commands.

2. The ESC system of claim 1, wherein the at least one processor is further configured to determine an operation mode based on the step-size and a step-size threshold.

3. The ESC system of claim 2, wherein the at least one processor is further configured to:
operate in an exploitation mode, if the step-size is greater than the step-size threshold; and
operate in an exploration mode, if the step-size is less than the step-size threshold.

4. The ESC system of claim 1,
wherein the cost function of the subject system is a convex function bounded by an upper bound and a lower bound, wherein the upper bound and the lower bound are scalars, and
wherein an analytical form of the cost function is unknown.

5. The ESC system of claim 4, wherein values of the consecutive measurements of the cost function are within a bound range defined by the upper bound and the lower bound of the cost function.

6. The ESC system of claim 1, wherein the subject system is a heating, ventilating, and air-conditioning (HVAC) system, and wherein the feedback generates the one or more control commands changing states of actuators of the HVAC system.

7. The ESC system of claim 1, wherein the subject system is a drone, an autonomous vehicle, or a robot.

8. An extremum seeking control method for controlling a subject system, wherein the method uses a processor coupled with stored instructions implementing the method, wherein the instructions, when executed by the processor carry out at least some steps of the method, comprising:
receiving a tracking error, consecutive measurements of a system output of the subject system, and consecutive measurements of a cost function of the subject system, wherein the tracking error is a difference between a set-point of the subject system and a measurement of the system output;
estimating a gradient indicating a direction of change of the set-point of the subject system, based on the tracking error, the consecutive measurements of the system output, and the consecutive measurements of the cost function of the subject system;
determining a weight based on the tracking error and a difference between the consecutive measurements of the system output;
determining a covariance of the gradient, based on the weight and the difference between the consecutive measurements of the system output;
determining a step-size based on a ratio of the covariance of the gradient to the gradient wherein the step-size corresponds to a magnitude of the change of the set-point of the subject system;
determining a set-point optimizing performance of the subject system, based on the direction of the change of the set-point of the subject system, and the magnitude of the change of the set-point of the subject system;
generating one or more control commands defining one or more operational parameters of the subject system, based on the determined set point; and
controlling the system according to the one or more control commands.

9. The extremum seeking control method of claim 8, further comprises determining an operation mode based on the step-size and a step-size threshold.

10. The extremum seeking control method of claim 9, further comprises operating in exploitation mode, if the step-size is greater than the step-size threshold.

11. The extremum seeking control method of claim 9, further comprises operating in an exploration mode, if the step-size is less than the step-size threshold.

12. The extremum seeking control method of claim 8, wherein the cost function of the system is a convex function bounded by an upper bound and a lower bound, wherein the upper bound and the lower bound are scalars, and wherein an analytical form of the cost function is unknown.

13. The extremum seeking control method of claim 12, wherein values of the consecutive measurements of the cost function are within a bound range defined by the upper bound and the lower bound of the cost function.

14. The extremum seeking control method of claim 8, wherein the subject system is one or a combination of a heating, ventilating, and air-conditioning (HVAC) system, a drone, an autonomous vehicle, and a robot.

15. A non-transitory computer-readable storage medium embodied thereon a program executable by a processor for performing a method, the method comprising:
receiving a tracking error, consecutive measurements of a system output, and consecutive measurements of a cost function of the subject system, wherein the tracking error is a difference between a set-point of the subject system and a measurement of the system output;
estimating a gradient indicating a direction of change of the set-point of the subject system, based on the tracking error, the consecutive measurements of the system output, and the consecutive measurements of the cost function of the subject system;
determining a weight based on the tracking error and a difference between consecutive measurements of the system output;
determining a covariance of the gradient, based on the weight and the difference between the consecutive measurements of the system output;
determining a step-size based on a ratio of the covariance of the gradient to the gradient, wherein the step-size corresponds to a magnitude of the change of the set-point of the subject system;
determining a set-point optimizing performance of the subject system, based on the direction of the change of the set-point of the subject system, and the magnitude of the change of the set-point of the subject system;
generating one or more control commands defining one or more operational parameters of the subject system based on the determine d set point; and
controlling the system according to the one or more control commands.

16. The computer-readable storage medium of claim 15, wherein the subject system is one or a combination of a heating, ventilating, and air-conditioning (HVAC) system, a drone, an autonomous vehicle, and a robot.

* * * * *